Nov. 7, 1933.  O. WITTEL  1,933,783

PHOTOGRAPHIC GATE FOR FILM

Filed March 20, 1931

Inventor
Otto Wittel,
By

Patented Nov. 7, 1933

1,933,783

UNITED STATES PATENT OFFICE 1,933,783

PHOTOGRAPHIC GATES FOR FILM

Otto Wittel, Rochester, N. Y., assignor to Eastman Kodak Company, Rochester, N. Y., a corporation of New York Application March 20, 1931. Serial No. 524,052

13 Claims. (Cl. 88—17)

This invention relates to a photographic gate for film and more particularly to a film gate for motion picture apparatus.

The inaccuracies which occur in photographic exposures or projection due to the irregular focal surface of the lens system have been overcome by providing a gate means which curves the film during exposure or projection substantially into said irregular focal surfaces of the lens system. This curving of the film by the gate member, because of the natural curl in the film, causes excessive friction or a snubbing action between the gate element and the film.

The primary object of the present invention is the provision of a photographic film gate composed of fixed gate elements having undulating surfaces which maintain the film substantially in the focal surface of the lens system without causing excessive friction between the film and gate elements.

Another object of the invention is the provision of a photographic film gate with fixed elements which maintain the film substantially in the focal surface of a lens or lens system and in a serpentine or sinuous path which is centrally concave to the lens system and convex to the lens system at the ends to allow the use of a large diameter shutter.

Still another object of the invention is the provision of a photographic film gate composed of gate elements with undulating surfaces and a spacing means maintaining said gate elements so that said undulating surfaces are in parallel or staggered relation and are spaced at a distance of two film thicknesses from each other.

A still further object of the invention is the provision of a photographic film gate composed of two gate elements having undulating surfaces or a plurality of transverse ridges, said gate elements being fixedly positioned so as to allow the passage through the gate of any splices in the film.

Other objects of the invention will be obvious to those skilled in the photographic or motion picture art as the description of the illustrative embodiment is developed hereinafter.

The above and other objects of the invention are attained in a photographic film gate composed of two elements with undulating surfaces and spacing means for the two gate elements which hold said elements in fixed staggered spaced relation to form a serpentine path for a film. The film is curved in passing through the film gate substantially into the focal surface of the lens system.

Reference is now made to the accompanying drawing in which like reference numerals designate similar elements and wherein.

Figure 1:
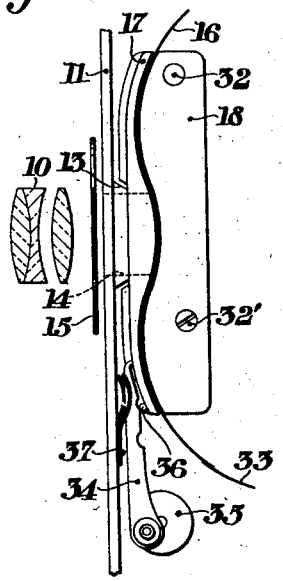
Fig. 1 is a side elevation of the photographic film gate of the invention showing the serpentine or sinuous path of the film therethrough.
Figure 2:
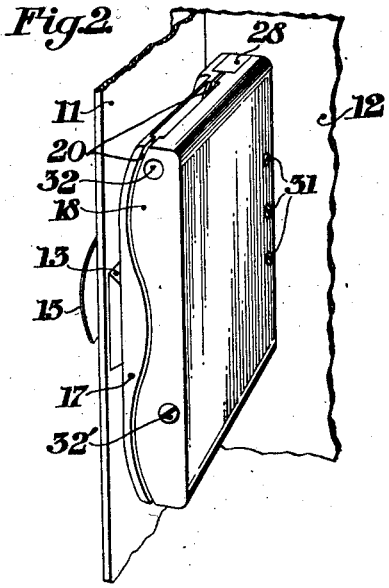
Fig. 2 is a perspective view of the photographic film gate showing the spacing means for the gate element.
Figure 3:
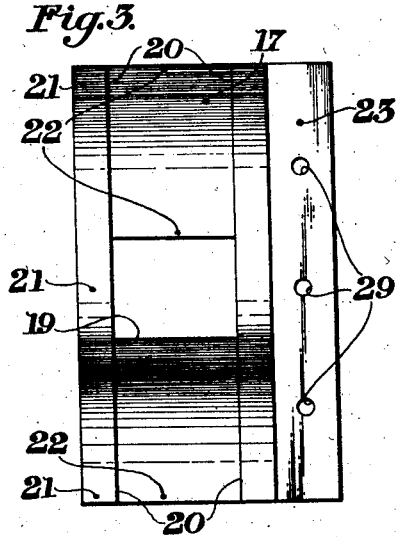
Fig. 3 is a rear elevation of one gate element showing the undulating surface composed of the transverse ridges.
Figure 4:
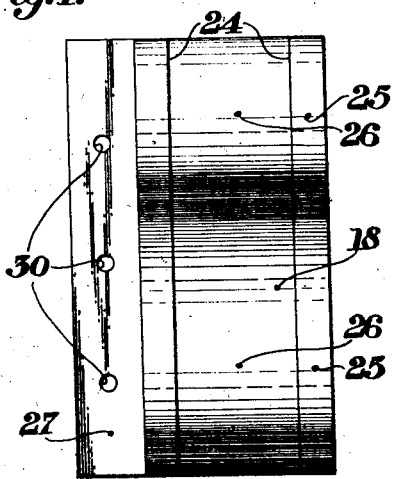
Fig. 4 is a front elevation of the other gate element showing the complementary undulating surface thereon.
Figure 5:
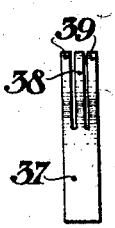
Fig. 5 is a front elevation of the pull-down spring.

In the illustrated embodiment of the invention the lens system 10 may be of any known type and has been diagrammatically illustrated as being composed of a plurality of elements. The selection of a lens system does not constitute part of the invention but merely involves an application of principles of optics. Therefore, any lens system which satisfies the optical and practical requirements for the apparatus may be used and will generally have a focal surface which is irregular and concave to the lens system.

The photographic film gate of the invention may readily be adapted to any type of photographic apparatus but has been illustrated as embodied in a motion picture camera having a front partition 11 and a wall 12 perpendicular thereto. Partition 11 and a trapezoidal embossing 13 thereon are provided with an aperture 14 co-axial with the lens system 10.

A shutter 15, preferably of the rotary type and of large diameter, is mounted in a known manner on front partition 11 to pass in front of aperture 14 between the lens system 10 and the film 16.

The photographic film gate of the invention comprises a pair of gate elements 17 and 18. The gate element 17 is provided with a centrally located aperture 19 and has a pair of runners 20 extending along one face on each side of aperture 19. The runners 20 and intervening face of gate element 17 have transverse ridges 21 and 22, respectively, to form undulating surfaces both on the gate element 17 and on the runners 20. A flat groove 23 is provided along one edge of gate element 17.

The grate element 18 as shown is solid for use in a camera but would be provided with an aperture to register with aperture 19 in gate element 17 if the film gate was to be used in a projector. Gate element 18 also has a pair of runners 24 which together with the intervening surface are provided with a plurality of transverse ridges 25 and 26 to form undulating surfaces respectively, on the gate element 18 and on the runners 24. A flat groove 27 is provided along one edge of gate element 18.

The photographic gate for film is assembled with the undulating surfaces of gate elements 17 and 18 facing each other and with the summits of transverse ridges 21 and 22 in staggered relation with respect to transverse ridges 25 and 26. The ridge summits on each gate element should be of equal frequency and preferably the undulating surfaces are complementary to each other so that when gate elements 17 and 18 are spaced apart a serpentine film path with parallel sides is formed therebetween. Hereafter the statement, that the undulating surfaces or summits of the ridges are in staggered relation, is deemed to include the condition that the gate elements are so positioned that the undulating surfaces or ridge summits are facing each other.

The positioning of the gate elements in staggered relation and in definite spaced relation is accomplished by a spacing means such as a spacing bar 28, the opposite sides of which abut each of the flat grooves 23 and 27 on the gate elements 17 and 18, respectively. The flat grooves 23 and 27 are also provided with a plurality of holes 29 and 30, respectively, one set of which is tapped to receive the threaded means such as bolts 31.

The location of holes 29 and 30 in the respective flat grooves 23 and 27 determines the staggered relation between the undulating surfaces on the gate elements 17 and 18 while the thickness of spacing bar 28 determines the spacing between said undulating surfaces. The absolute fixed mounting of the gate elements 17 and 18 is a departure from present forms of gate construction and constitutes part of the novelty of the present invention.

The thickness of spacing bar 28 is such that the undulating surfaces of the runners 20 and 24 are spaced at a distance of two film thicknesses from each other and by necessary implication the distance is measured along a line normal to and between said undulating surfaces. The expression "two film thicknesses" as used in this specification and in the claims is deemed to include the thickness of a film spliced to a leader strip 33 as for a camera, the thickness of two spliced films as for a projector and the thickness of two abutting films as for a printer, plus the necessary clearance for the passage of any of the aforementioned two film thicknesses to pass through the film gate without binding.

The assembled gate is mounted within the photographic apparatus in any known or suitable manner such as by a pin 32 mounted on the wall 12 making a sliding fit with gate element 18 and a locating bolt 32' screwed into wall 12 so that aperture 19 in gate element 17 registers with aperture 14 in partition 11 and embossing 13.

The path of the film 16 through the assembled gate is illustrated in Fig. 1. The film 16 whether a single thickness or spliced to a leader or other film makes surface contact with the summits of ridges 21 and 25 on the runners 20 and 24 of gate elements 17 and 18 respectively. If the film is a single thickness there will be no contact with the hollows between the ridges 21 and 25 but if a splice or double film thickness passes through the gate there may be a sliding contact with said hollows. In any event the film 16 makes surface contact with the center ridges 21 of runners 20 on gate element 17 and ridges 25 on runners 24 of gate element 18 so that the film is given a serpentine formation. The height or amplitude of ridges 21 and 25 will be determined by the curvature of the focal surface of the lens system 10 so that the film will be curved adjacent aperture 19 substantially into the focal surface of said lens system.

The particular description of the photographic gate of the invention has been predicated on the assumption that the focal surface of the lens system is concave thereto as would generally be the case. However, if the focal surface of the lens system is convex thereto then the gate elements should be reversed so that the film also will be curved convexly into the focal surface of such a lens system.

The film is advanced through the film gate by means of a claw pull-down mechanism. The pull-down claw 34 is eccentrically mounted at one end on a rotating disc 35 which is either manually or power driven in a known manner and the other end of the claw 34 is adapted to enter a slot in gate element 17 to engage perforations in film 16.

One edge of the claw 34 has a pair of notches which are held in sliding abutment with a cam 36 on the back of gate element 17 by means of a spring 37 which is mounted on partition 11. Spring 37 has a center tongue 38 which slidably engages the edge of claw 34 opposite the notched edge thereof while the extreme tongues 39 of the spring 37 perform a lateral guiding function for the claw 34.

Having particularly described my invention what I desire to secure by Letters Patent of the United States and what I claim is:

1. A photographic gate for a single film comprising a pair of gate elements, a pair of runners on each gate element and having undulating surfaces, and spacing means for said gate elements to fix said surfaces in staggered relation and spaced at a distance of two film thicknesses from each other.

2. A photographic gate for film comprising a pair of gate elements having undulating surfaces, a pair of runners on each gate element having undulating surfaces, and spacing means for said gate elements to fixedly mantain the undulating surfaces on said runners in staggered relation and spaced at a distance of two film thicknesses from each other.

3. In a photographic apparatus, the combination with a lens system having a curved focal surface, of a photographic gate for a single film comprising a pair of gate elements having undulating surfaces adapted to curve the film into the focal surface of the lens system, and spacing means fixedly spacing said gate elements with said undulating surfaces in staggered relation and spaced at a distance of two film thicknesses from each other.

4. In a photographic apparatus, the combination with a lens system for the apparatus, of a photographic gate for a single film comprising a pair of gate elements, a pair of runners on each gate element and having undulating surfaces centrally concave to said lens system, and spacing means for said gate elements to fixedly space said undulating surfaces in staggered relation and at a distance of two film thicknesses from each other.

5. In a photographic apparatus, the combination with a lens system for the apparatus, of a photographic gate for a single film comprising a pair of gate elements provided with a gate aperture, a pair of runners on each gate element and having undulating surfaces centrally concave to said lens system, and spacing means for said gate elements to fixedly space said undulating surfaces in staggered relation and at a distance of two film thicknesses from each other whereby the film is curved at the gate aperture into the curved focal surface of the lens system.

6. A photographic gate for a single film comprising a pair of gate elements, a pair of runners on each gate element having surfaces centrally curved in one direction and reverse curves at each end, and spacing means for said gate elements to fixedly maintain the surfaces on said runners in staggered relation and spaced at a distance of two film thicknesses from each other.

7. A photographic gate for a single film comprising a pair of gate elements provided with a gate aperture, a pair of runners on each gate element having surfaces curved adjacent to said gate aperture about a center of curvature on one side of the gate elements and at each end about a center of curvature on the other side of the gate elements, and spacing means for said gate elements to fixedly mantain the surfaces on said runners in staggered relation and spaced at a distance of two film thicknesses from each other.

8. In a photographic apparatus, the combination with a lens system for the apparatus, of a photographic gate for a single film comprising a pair of gate elements, a pair of runners on each gate element and having undulating surfaces centrally concave to said lens system at the gate aperture, and convex to said lens system at each end of the gate element, and spacing means for said gate elements to fixedly maintain the surfaces on said runners in staggered relation and spaced at a distance of two film thicknesses from each other.

9. In a photographic apparatus, the combination with a lens system and shutter of large diameter for the apparatus, of a photographic gate for a single film comprising a pair of gate elements provided with a gate aperture, a pair of runners on each gate element having surfaces curved adjacent to said gate aperture concave to the lens system and shutter, and curved convexly to said lens system and shutter at the ends of said runners, and spacing means for said gate elements to fixedly mantain the surfaces on said runners in staggered relation and spaced at a distance of two film thicknesses from each other whereby the film gate does not interfere with said large diameter shutter.

10. A photographic gate for a single film comprising a pair of gate elements, a pair of runners on each of said elements and each having ridges with summits in respective flat planes to form undulating surfaces on the runners, and a spacing means fixedly spacing said gate elements with said undulating surfaces in staggered relation and spaced at a distance of two film thicknesses from each other.

11. A photographic gate for film comprising a pair of gate elements, a pair of runners on each of said elements and having undulating surfaces, and a spacing bar fixedly spacing said gate elements with said undulating surfaces in staggered relation and spaced at a distance of two film thicknesses from each other.

12. A photographic gate for a single film comprising a pair of gate elements, a pair of runners on each of said elements and having undulating surfaces, a spacing bar spacing said gate elements with said undulating surfaces at a distance of two film thicknesses from each other, and threaded means fixedly securing said spacing bar and said gate elements together with the undulating surfaces of said runners in staggered relation.

13. A photographic gate for film comprising a pair of gate elements, a pair of runners on each gate element and having a plurality of ridges which extend transversely of the film, and a spacing means for said gate elements for fixedly maintaining the ridges of said runners in staggered relation and spaced from each other at a distance of at least two film thicknesses but less than the altitude of said ridge.

OTTO WITTEL.